United States Patent
Shepelev (10) Patent No.: US 9,495,052 B2
(45) Date of Patent: Nov. 15, 2016

(54) ACTIVE INPUT DEVICE SUPPORT FOR A CAPACITIVE SENSING DEVICE

(71) Applicant: Synaptics Incorporated, San Jose, CA (US)

(72) Inventor: Petr Shepelev, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/577,454

(22) Filed: Dec. 19, 2014

(65) Prior Publication Data

US 2016/0179242 A1 Jun. 23, 2016

(51) Int. Cl.
G06F 3/044 (2006.01)

(52) U.S. Cl.
CPC .................................... G06F 3/044 (2013.01)

(58) Field of Classification Search
CPC ........................................ G06F 3/041–3/047
USPC ...................... 178/18.01–18.11; 345/173–178
See application file for complete search history.

(56) References Cited

U.S. PATENT DOCUMENTS

| 7,928,964 | B2 | 4/2011 | Kolmykov-Zotov et al. |
| 8,018,440 | B2 | 9/2011 | Townsend et al. |
| 8,493,359 | B2 | 7/2013 | Wright et al. |
| 8,521,791 | B2 | 8/2013 | Chen et al. |
| 8,587,526 | B2 | 11/2013 | Engelhardt et al. |
| 8,773,386 | B2 | 7/2014 | Wilson et al. |
| 2009/0095540 | A1 | 4/2009 | Zachut et al. |
| 2009/0207154 | A1 | 8/2009 | Chino |
| 2010/0026655 | A1 | 2/2010 | Harley |
| 2010/0053095 | A1 | 3/2010 | Wu et al. |
| 2010/0308844 | A1 | 12/2010 | Day et al. |
| 2011/0012855 | A1 | 1/2011 | Yeh et al. |
| 2012/0182238 | A1 | 7/2012 | Lee |
| 2012/0256845 | A1 | 10/2012 | Noble |
| 2012/0306744 | A1 | 12/2012 | Hoffman et al. |
| 2013/0265271 | A1 | 10/2013 | Hsu et al. |
| 2013/0300696 | A1 | 11/2013 | Haran et al. |
| 2014/0071360 | A1* | 3/2014 | Chang .................. G06F 3/0412 349/12 |
| 2014/0176448 | A1 | 6/2014 | Huie |
| 2014/0210787 | A1 | 7/2014 | King-Smith et al. |
| 2014/0267067 | A1* | 9/2014 | Fuller .................. G06F 3/0416 345/173 |

FOREIGN PATENT DOCUMENTS

JP 2014066654 A 4/2014
WO 2013024225 A1 2/2013

OTHER PUBLICATIONS

International Search Report and Written Opinion PCT/US2015/055062, Dated Feb. 25, 2016, Consists of 10 pages.

* cited by examiner

*Primary Examiner* — Michael Pervan
(74) *Attorney, Agent, or Firm* — Patterson + Sheridan, LLP (57) ABSTRACT

A processing system, input device, and method are disclosed to provide active input device support for a capacitive sensing device. The method includes operating, during a first time period, a plurality of sensor electrodes to receive an input signal from an active input device at a processing system, and determining an exclusion region based on a determined position of the active input device during the first time period. The method further includes operating, during a different second time period, the plurality of sensor electrodes to receive capacitive sensing data corresponding to a passive input device. A portion of the plurality of sensor electrodes corresponding to the exclusion region is excluded from use in determining input to the processing system during the second time period.

24 Claims, 5 Drawing Sheets

ACTIVE INPUT DEVICE SUPPORT FOR A CAPACITIVE SENSING DEVICE

BACKGROUND

Field of the Disclosure

Embodiments of the present disclosure generally relate to electronic devices.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In one embodiment, a processing system is disclosed that includes a sensor module configured to operate a plurality of sensor electrodes to receive an input signal from an active input device during a first time period and capacitive sensing data corresponding to a passive input device during a different, second time period. The processing system also includes a determination module configured to determine an exclusion region based on a determined position of the active input device during the first time period, wherein a portion of the plurality of sensor electrodes corresponding to the exclusion region is excluded from use in determining input to the sensor module during the second time period.

In another embodiment, an input device is disclosed that includes a plurality of display electrodes, a plurality of sensor electrodes, and a processing system coupled to the plurality of display electrodes and to the plurality of sensor electrodes. The processing system is configured to operate the plurality of sensor electrodes to receive an input signal from an active input device during a first time period and capacitive sensing data corresponding to a passive input device during a different, second time period. The processing system is further configured to determine an exclusion region based on a determined position of the active input device during the first time period, wherein a portion of the plurality of sensor electrodes corresponding to the exclusion region is excluded from use in determining input to the processing system during the second time period.

In yet another embodiment, a method is disclosed that includes operating, during a first time period, a plurality of sensor electrodes to receive an input signal from an active input device at a processing system, and determining an exclusion region based on a determined position of the active input device during the first time period. The method further includes operating, during a different second time period, the plurality of sensor electrodes to receive capacitive sensing data corresponding to a passive input device. A portion of the plurality of sensor electrodes corresponding to the exclusion region is excluded from use in determining input to the processing system during the second time period.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description.

Various embodiments of the present technology provide input devices and methods for improving usability.

Techniques are disclosed for coordinating active and passive input sensing during a common sensing frame. During operation, active input devices generate signals that may interfere with touch sensing or other (passive) capacitive sensing techniques, which generally rely on measured changes in received charge, capacitance, current, voltage, etc. By sequencing an active input sensing period to precede a passive input sensing period within a sensing frame, the location of the active input device may be determined during the active input sensing period and a spatial exclusion region determined for the active input device. The exclusion region may be expanded to accommodate any possible variability of the active input signals or movement of the active input device. Correspondingly, sensor electrodes included in the exclusion region that are affected or that could be affected by signals emitted from the active input device may be excluded from determining passive inputs to the processing system during a passive input sensing period. Benefits of this approach include supporting a substantially concurrent sensing of active and passive input devices without requiring different or additional sensor electrodes, so that input devices that are originally configured to receive passive inputs may be operationally adapted to accommodate active input devices of various types. Additionally, the techniques described herein may be used to adaptively improve measurement accuracy and active and/or passive sensing performance.

Figure 1:
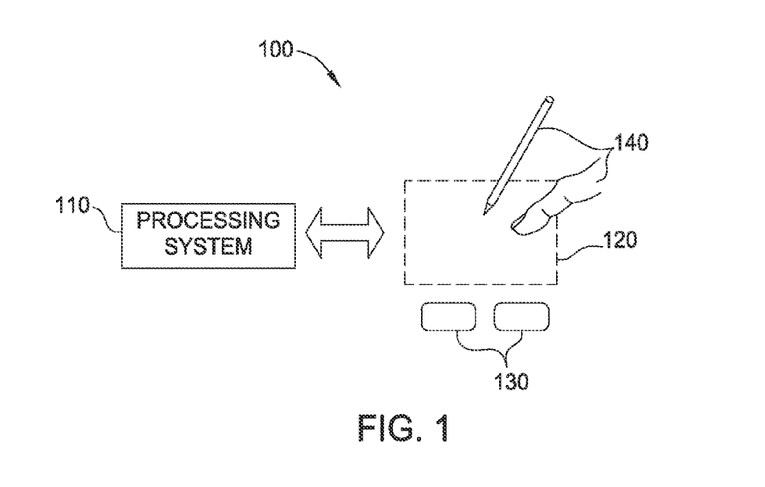
FIG. 1 is a block diagram of an exemplary input device 100, according to embodiments described herein.

Turning now to the figures, FIG. 1 is a block diagram of an exemplary input device 100, in accordance with embodiments of the disclosure. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IrDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
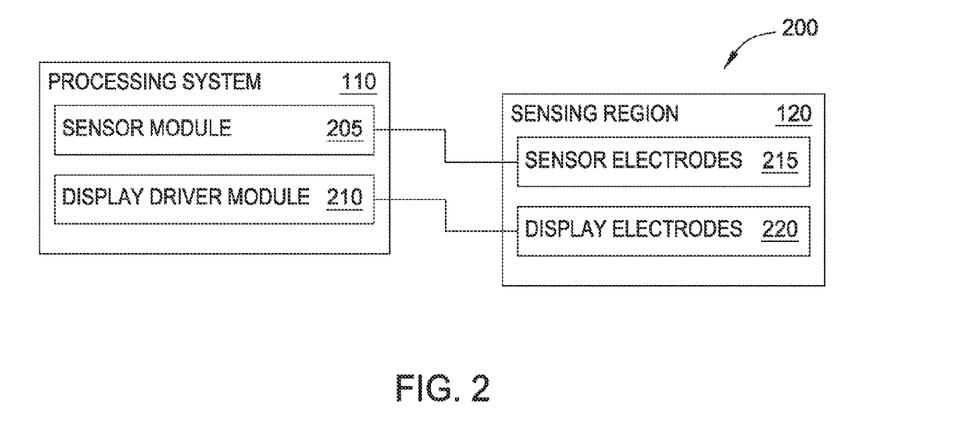
FIG. 2 is a block diagram of a processing system coupled with sensor electrodes and display electrodes, according to one embodiment.

FIG. 2 is a block diagram of processing system 110 coupled to sensor electrodes 215 and display electrodes 220 in accordance with an embodiment of the disclosure. Specifically, FIG. 2 illustrates a system 200 where processing system 110 is coupled to electrodes in the sensing region 120. The processing system 110 includes a sensor module 205 and display driver module 210. As stated above, each module may comprise circuitry that is a part of the processing system 110, firmware, software, or a combination thereof. The sensor module 205 is coupled to the sensor electrodes 215 and is used to perform capacitive sensing by driving a capacitive sensing signal onto the sensor electrodes 215 and measuring an effect caused by the capacitive sensing signal (e.g., a change in charge, current, voltage, etc.).

In one embodiment, a set of measurements from a plurality of capacitive pixels form a "capacitive image" (also "capacitive frame") representative of the capacitive couplings at the capacitive pixels. Multiple capacitive images may be acquired over multiple time periods, and differences between them used to derive information about input in the sensing region 120. For example, successive capacitive images acquired over successive periods of time can be used to track the motion(s) of one or more input objects entering, exiting, and within the sensing region 120. In one embodiment, the sensor module 205 uses sensor bursts to measure the capacitive pixels and form the capacitive image or frame. However, because interfering signals may affect the measurements acquired during the sensor bursts, the sensor module 205 uses one or more interference bursts during each capacitive frame to perform interference detection. For example, the interference bursts may be performed the beginning or end of each capacitive frame. If the sensor module 205 detects an interfering signal, the module 205 may change the frequency of the sensor bursts.

The display driver module 210 is coupled to a plurality of display electrodes 220 which are used to update display lines in a display. In one embodiment, the operation of the display driver module 210 may control when the sensor module 205 performs capacitive sensing. For example, once updated display data is received, the display driver module 210 may pause capacitive sensing performed by the sensor module 205 and update the display using the received display data. Once the display is updated, the display driver module 210 may resume capacitive sensing. As such, the interference bursts may be separated from one or more of the sensor bursts in the same capacitive fame by a display update period.

The display driver module 210 may be included with or separate from the sensor module 205. In one embodiment, the processing system comprises a first integrated controller comprising the display driver module 210 and at least a portion of the sensor module 205 (i.e., transmitter module and/or receiver module). In another embodiment, the processing system comprises a first integrated controller comprising the display driver module 210 and a second integrated controller comprising the sensor module 205. In yet another embodiment, the processing system comprises a first integrated controller comprising a display driver module 210 and one of a transmitter module or a receiver module and a second integrated controller comprising the other one of the transmitter module and receiver module.

In one embodiment, one or more of the sensor electrodes 215 include one or more display electrodes 220 used in updating the display. That is, instead of the sensor electrodes 215 being separate from the display electrodes 220 as shown, a shared display electrode may be used to perform both capacitive sensing and display updating. In one or more embodiment, the display electrodes may comprise one or more segments of a Vcom electrode, a source drive line, gate line, an anode electrode or cathode electrode, or any other display element. Because the display electrodes may be used both when performing capacitive sensing and when updating the display, in one embodiment, the processing system 110 may not perform capacitive sensing and display updating simultaneously.

The display electrodes may be disposed on a transparent substrate (a glass substrate, TFT glass, or any other transparent material) in some display screens (e.g., In-Plane Switching (IPS) or Plane-to-Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 215 comprises one or more common electrodes. In other embodiments, at least two sensor electrodes 215 may share at least one common electrode.

FIGS. 3A-3D illustrate determining exclusion regions for receiving passive input, according to various embodiments. Each of FIGS. 3A-3D include a portion of an exemplary pattern of capacitive sensing pixels 305 (also referred to herein as capacitive pixels or sensing pixels) that are formed using a plurality of sensor electrodes configured to sense in the sensing region 120 associated with the pattern, according to some embodiments. Each capacitive pixel 305 may include one of more of the sensing elements described above, either wholly or in part, such as sensor electrodes 215. For clarity of illustration and description, FIGS. 3A-3D present the regions of the capacitive pixels 305 in a pattern of simple rectangles and do not show various other components within the capacitive pixels 305. In one embodiment, the capacitive sensing pixels 305 represent areas of localized capacitance (capacitive coupling). Capacitive pixels 305 may be formed between an individual sensor electrode and ground in a first mode of operation (i.e., absolute sensing) and between groups of sensor electrodes operated as transmitter and receiver electrodes in a second mode of operation (i.e., transcapacitive sensing). The capacitive coupling changes with the proximity and motion of input objects in the sensing region 120 associated with the capacitive pixels 305, and thus may be used as an indicator of the presence of the input object in the sensing region 120 of the input device.

The exemplary pattern comprises an array of capacitive sensing pixels $305_{X,Y}$ (referred to collectively as pixels 305) arranged in X rows and Y columns, wherein X and Y are positive integers, although one of X and Y may be zero. As shown, the pattern includes six rows and six columns, but any suitable alternative values may be selected. It is contemplated that the pattern of sensing pixels 305 may include a plurality of sensing pixels 305 having other configurations, such as polar arrays, repeating patterns, non-repeating patterns, non-uniform arrays, a single row or column, or any other suitable arrangement. Further, as will be discussed in more detail below, the sensor electrodes (e.g., sensor electrodes 215) corresponding to the sensing pixels 305 may be any shape such as circular, rectangular, diamond, star, square, nonconvex, convex, nonconcave, concave, etc. Although not shown here, the sensing pixels 305 are coupled with the processing system 110 through sensor electrodes 215 and utilized to determine the presence (or lack thereof) of an input object in the sensing region 120. In one or more embodiments, each sensor electrode of the sensing pixel 305 overlaps one or more source lines. Each source line is capacitively coupled to the sensor electrode, and when the voltage on source lines is changed, charge may be injected into the sensor electrode. This injected charge may cause errors within the measured change in capacitance. In one or more embodiments, the charge injected by each source line coupled to a sensor electrode may be subtracted. Further, in other embodiments, an average amount of charge injected by each source line coupled to a sensor electrode may be subtracted. In yet other embodiments, a reference electrode may be disposed such that it overlaps a common set of source lines with at least one sensor electrode of sensor electrodes 215. A resulting signal that corresponds to charge received from the source lines and injected into the reference electrode may be subtracted from the resulting signal of each corresponding sensor electrode.

In a first mode of operation, at least one sensor electrode within the capacitive sensing pixels 305 may be utilized to detect the presence of an input object via absolute sensing techniques. The sensor module (e.g., sensor module 205) of processing system 110 is configured to drive a sensor electrode in each capacitive pixel 305 with a modulated signal and to measure a capacitance between the sensor electrode and the input object (e.g., free space or earth ground) based on the modulated signal, which is utilized by the processing system 110 or other processor to determine the position of the input object. In various embodiments, these modulations of the sensor electrodes are accomplished by changing the voltage of the sensor electrodes relative to a system ground of an input device, where the system ground is separately coupled to earth ground.

The various electrodes of capacitive pixels 305 are typically ohmically isolated from the electrodes of other capacitive pixels 305. Additionally, where a pixel 305 includes multiple electrodes, there electrodes may be ohmically isolated from each other. That is, one or more insulators separate the sensor electrodes and prevent them from electrically shorting to each other. Furthermore, in one embodiment, the sensor electrodes in the capacitive pixels 305 may be ohmically insulated from a grid electrode (not shown) that is disposed between the capacitive pixels 305. In one example, the grid electrode may at least partially circumscribe (or surround) one or more of the capacitive pixels 305. The grid electrode may be used as a shield or to carry a guarding signal for use when performing capacitive sensing with the sensor electrodes in the pixels 305. Alternatively or additionally, the grid electrode may be used as a sensor electrode when performing capacitive sensing. Furthermore, the grid electrode may be co-planar with the sensor electrodes corresponding to the capacitive pixels 305, but this is not a requirement. For instance, the grid electrode may be located on a different substrate or on a different side of the same substrate as the sensor electrodes. In various embodiments, the power supply of the display device or an associated power supply of the display device may be modulated relative to system ground such that the reference voltage(s) provided are modulated.

In a second mode of operation, sensor electrodes corresponding to the capacitive pixels 305 are utilized to detect the presence of an input object via transcapacitance sensing techniques. That is, processing system 110 may drive at least one sensor electrode in a pixel 305 with a transmitter signal and receive resulting signals using one or more of the other sensor electrodes in the pixel 305, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 305 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply (e.g., ganged together) to acquire resulting signals. The resulting signals may be used to determine measurements of the capacitive couplings at the capacitive pixels 305.

In other embodiments, "scanning" pixels 305 to determine these capacitive couplings includes driving with a modulated signal (or an absolute capacitive sensing signal) and measuring the absolute capacitance of one or more of the sensor electrodes. In another embodiment, the sensor electrodes may be operated such that the modulated signal is driven on a sensor electrode in multiple capacitive pixels 305 at the same time. In such embodiments, an absolute capacitive measurement may be obtained from each of the one or more pixels 305 simultaneously. In one embodiment, the input device 100 simultaneously drives a sensor electrode in a plurality of capacitive pixels 305 and measures an absolute capacitive measurement for each of the pixels 305 in the same sensing cycle. In various embodiments, processing system 110 may configured to selectively drive and receive with a portion of sensor electrodes. For example, the portion of sensor electrodes may be selected based on, but not limited to, an application running on the host processor, a status of the input device, an operating mode of the sensing device and a determined location of an input device. In various embodiments, all of sensor electrodes of the sensing pixels 305 may be simultaneously modulated and a grid electrode may be modulated to operate as a guard electrode relative to a system ground, while selected sensor electrodes of the sensing pixels 305 are received with and measured via a multiplexer, such that a selected region of the sensing region 120 may be sensed at a time. In one embodiment, the selected region may be selected such that it is positioned away from gate lines driven for display updating. In one or more embodiments, scanning may occur while the sensor electrodes are not modulated but are received to obtain a measurement of the interference.

Figure 3A:
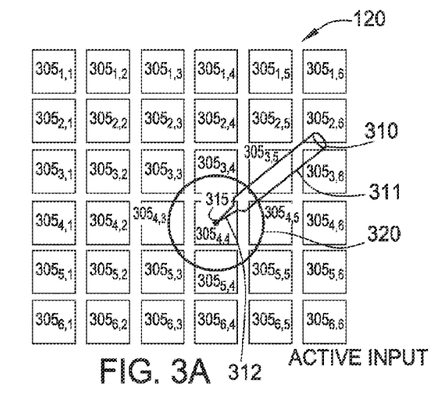
FIGS. 3A-3D illustrate determining an exclusion region for receiving passive input, according to one embodiment.

As was discussed with respect to FIG. 2, the processing system 110 coupled to the sensor electrodes includes a sensor module 205 and optionally, a display driver module 210. In one embodiment, the sensor module comprises circuitry configured to drive a transmitter signal or an absolute capacitive sensing signal onto and receive resulting signals with the sensor electrodes during periods in which input sensing is desired. In one embodiment, the sensor module 205 includes a transmitter module including circuitry configured to drive a transmitter signal onto the sensor electrodes during periods in which input sensing is desired. The transmitter signal is generally modulated and contains one or more bursts (sensing cycles) over a period of time allocated for input sensing. The transmitter signal may have an amplitude, frequency and voltage which may be changed to obtain more robust location information of the input object in the sensing region. The transmitter may couple to a modulated power supply domain, such that the display electrodes are modulated relative to a system ground. Further, in various embodiments, the transmitter may be separate from, or included with, a source driver. The absolute capacitive sensing signal used to perform absolute capacitive sensing may be the same or different from the transmitter signal used to perform transcapacitance sensing. The modulated signal may also be referred to as an absolute capacitive sensing signal. The sensor module 205 may be selectively coupled to one or more of the sensor electrodes in the capacitive pixels 305. For example, the sensor module 205 may be coupled to selected portions of the sensor electrodes and operate in either an absolute or transcapacitance sensing mode. In another example, the sensor module 205 may be coupled to different sensor electrodes when operating in the absolute sensing mode than when operating in the transcapacitance sensing mode.

In various embodiments the sensor module 205 may comprise a receiver module that includes circuitry configured to receive a resulting signal with the sensor electrodes comprising effects corresponding to the transmitter signal during periods in which input sensing is desired. In one or more embodiments, the receiver module is configured to drive a modulated signal onto a first sensor electrode in one of the pixels 305 and receive a resulting signal corresponding to the modulated signal to determine changes in absolute capacitance of the sensor electrode. The receiver module may determine a position of the input object in the sensing region 120 or may provide a signal including information indicative of the resulting signal to another module or processor, for example, a determination module or a processor of the electronic device (i.e., a host processor or a timing controller with integrated sensor processor), for determining the position of the input object in the sensing region 120. In one or more embodiments, the receiver module comprises a plurality of receivers, where each receiver may be an analog front end (AFE). Further, at least a portion of the receiver module may be disposed within a source driver.

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing.

In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In these embodiments, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times. Non-display update periods may be used for sensing other than touch sensing (e.g., interference measurements, active modulated inputs). In various embodiments, non-display update periods may be used to maintain constant display frame rates while the line rate is changing for input sensing, such that neither display updating nor input sensing are significantly affected (i.e., maintaining a constant input sensing report rate, display refresh rate, and the like).

In some embodiments, an input device 100 may receive input from both active input devices and passive input devices. As defined herein, an active input device provides input by emitting one or more electrical signals that are capable of being detected within a sensing region (e.g., sensing region 120) of an input device (e.g., input device 100). Some non-limiting examples of active input devices include powered pens or styli, but other suitable form factors and arrangements may be used. An active input device generally includes a power source (such as a battery) and powered circuitry. As shown, active input device 310 is depicted as an active pen including circuitry within a housing 311 and that transmits signals through a pen tip 312 (which may be conductive in some implementations). Signals generated by the active input device 310 may provide information to the input device 100, which may include positional data, the operational state of various components of the active input device 310 (e.g., a force applied on pen tip 312, whether buttons included on housing 311 are depressed), battery data, device identification data, and so forth.

On the other hand, passive input devices generally do not emit electrical signals, but instead provide input by influencing nearby electrical signals. For example, a passive input device may be detected by performing capacitive coupling measurements using the various capacitive sensing techniques described above. In some embodiments, one or more sensor electrodes are driven with a capacitive sensing signal, and the resulting detected signal indicates the presence or absence of a passive input device. Some non-limiting examples of passive input devices include fingers and unpowered pens or styli.

For an input device to accurately measure for both passive and active inputs within a common sensing region, it may be beneficial to distinguish these inputs using at least one of time separation, spatial separation, and frequency separation in order to minimize the effects caused by each type of input influencing the other. For example, the signals that are emitted by the active input devices may cause undesired effects (e.g., charge coupling or decoupling with sensor electrodes) while performing capacitive sensing techniques, thereby degrading the ability of the input device to perform passive input detection.

In some embodiments, the processing system may operate the sensor electrodes in distinct modes for detecting passive input and for detecting active input. In order to detect both passive and active inputs within a single sensing period (e.g., during a particular non-display period, such as a long h-blank period), in one embodiment the processing system may operate the sensor electrodes of sensing region 120 for a first period of time in an active input mode, and for a second period of time in a passive input mode. Specific timing considerations will be further discussed below with respect to FIGS. 4A and 4B.

Referring now to FIG. 3A, sensor electrodes of the sensing region 120 are operated in an active input mode at a first time, and input signals from an active input device 310 are received within the sensing region 120. In one embodiment, the input received by the capacitive pixels 305 during an active input mode may be used to localize (e.g., locate and isolate) the effects of the active input device during periods of passive input sensing. At the first time during the active input mode, active input device 310 is located at a first position relative to the sensing region 120. As shown, the pen tip 312 is disposed at a position 315 that is nearest to pixel $305_{4,4}$. The position 315 is depicted as roughly centered relative to the x-y area of pixel $305_{4,4}$; however, the pen tip 312 may be disposed at any alternate position relative to pixels 305 of the sensing region 120. The signals emitted from pen tip 312 may couple with one or more capacitive pixels 305, with the relative strength of the received signal providing an indication of the position of the pen tip 312 relative to the pixels 305. For example, a stronger signal received by a particular capacitive pixel generally indicates that the pen tip 312 is closer to the pixel than to another pixel that received a weaker signal. For ease of illustration and description, the signals emitted from pen tip 312 are represented as affecting capacitive pixels that are at least partially included within a zone 320 surrounding the position 315 of the pen tip 312. In one embodiment, each pixel 305 may be configured to receive input signals from active input device 310 during the active input sensing period. As shown, zone 320 includes at least part of pixels $305_{3,4}$, $305_{4,3}$, $305_{4,4}$, $305_{4,5}$, and $305_{5,4}$, indicating that each of these five pixels (or more specifically, sensor electrodes corresponding to these pixels) detects the active input signals emitted from the pen tip 312 at least at some threshold level. Generally, the zone 320 may define a region in which a signal strength of the active input signal exceeds some threshold sensed level at the capacitive pixel. While zone 320 is depicted as circular and including the position 315 at an approximate centroid of the zone 320, in some embodiments the zone 320 may have any suitable shape and size corresponding to the effects of the active signal on the pixels 305. The active signal effects may vary according to the configuration of the pen (e.g., power output levels or other signal properties) and the orientation of the pen and pen tip relative to the pixels 305.

Although the spatial position 315 of pen tip 312 has been described relative to the signals emitted from the pen tip 312, the position 315 may not be immediately known to the processing system. Therefore, in response to receiving input signals from the active input device 310 during an active input mode (and corresponding to zone 320), the processing system may calculate the position 315 of the active input device 310. Position 315 may include x and y-coordinates (e.g., indicating a position of the pen tip 312 in the x-y plane and relative to one or more pixels 305). Position 315 may also include a calculated z-coordinate based on the strength of the input signals from the active input device 310 (e.g., indicating a distance or "hover height" of the pen tip 312). Of course, alternate coordinate systems (e.g., polar coordinates) may be used depending on the arrangement of the capacitive pixels 305. The processing system may then use the information about position 315 and/or zone 320 to subsequently isolate the effects of active input device 310 during periods of passive input sensing.

Figure 3B:
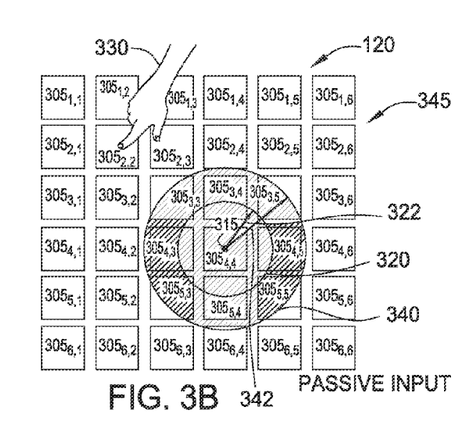

Referring now to FIG. 3B, at a second time the sensor electrodes of the sensing region 120 are operated by the processing system in a passive input mode to detect input from a passive input device, such as fingers 330. The passive input mode at the second time generally follows the active input mode at the first time. The time difference between the first and second times may be on the order of microseconds or milliseconds, so that effects on sensor electrodes caused by the active input device 310 emitting signals during the active input mode may persist in the passive input mode. Furthermore, the active input device 310 may operate independently of the timing of the processing system, and so may continue to emit active input signals even during passive input periods. Such a situation may occur in implementations where a capacitive sensing-based input device is operationally adapted to receive input from an active input device. Stated differently, the same (i.e., common or shared) sensor electrodes of the capacitive sensing-based input device are used to receive both passive and active input signals, and the processing system operates the sensor electrodes in such a way as to suitably accommodate both types of input signals (such as temporally separating active and passive input periods).

During the passive input mode, the effects of emitted signals from active input device 310 may degrade the ability of the processing system to determine passive input. As shown, the position 315 of the active input device 310 (not shown) remains approximately the same as at the first time. In one embodiment, the processing system may determine an exclusion region 340 to isolate the effects of the active input device 310 on passive input sensing.

In one embodiment, the exclusion region 340 may be coextensive with the determined zone 320, so that only those capacitive pixels 305 affected by the input signals of the active input device 310 will be excluded. In other embodiments, however, the exclusion region 340 may define a larger area than zone 320 and may include one or more additional capacitive pixels. It is possible that the active input device 310 will move at some point during the passive input sensing, which may affect the signals received at various capacitive pixels 305. As shown, the exclusion region 340 includes a larger area and includes portions of capacitive pixels $305_{3,3}$, $305_{3,5}$, $305_{5,3}$, and $305_{5,5}$ which were not included in the zone 320.

The exclusion region 340 may be determined in any suitable manner. In one embodiment, the processing system may first determine the zone 320 based on the received input signals from the active input device 310. The processing system may also calculate one or more properties of the determined zone 320, such as a radius 322 or diameter of the zone along a dimension. In cases where the zone 320 has a generally elliptical shape, this may include determining a radius along the major and/or minor axes of the zone 320. The exclusion region 340 may be selected based on the calculated properties, e.g., a similar shape having a larger radius 342 than the radius 322.

In another embodiment, the exclusion region 340 may be defined by discretely adding one or more capacitive pixels to the set of capacitive pixels 305 included in the zone 320. For example, the processing system may extend the exclusion region 340 by adding one or more capacitive pixels 305 that are adjacent to those of the zone 320.

In various embodiments, the size of the exclusion region 340 relative to the zone 320 may be determined based on a calculated confidence measure. The confidence measure may help account for any variability in the position of the active input device or in the emitted signals. For example, the confidence measure may be based on a calculated velocity of the pen tip, and a larger velocity of the pen tip may correspond to a larger exclusion region (e.g., a greater distance covered before a next time determining pen tip position, greater variability for velocity changes, and so forth). The confidence measure may reflect current, historical, and/or estimated movement of pen tip. In one embodiment, the confidence measure may be based on a product of a rate of movement and an estimated amount of time until the next active sensing period. In one embodiment, the confidence measure may be based on a determined z-coordinate of the pen tip. For example, movement in the +/−z-direction may have an effect on how far the active input signals emitted from the active input device laterally diffuse (i.e., within the x-y plane).

The processing system may operate capacitive pixels 305 within the exclusion region 340 differently than the pixels 305 included in a non-exclusion region 345 of the sensing region 120. In one embodiment, the processing system does not drive the pixels within the exclusion region during the passive input period. In another embodiment, the pixels may be driven normally (e.g., with a capacitive sensing signal), but input data that is subsequently received from those pixels is ignored when determining passive input.

Therefore, during a passive input period, a finger 330 that is disposed at a location 335 may be detected using capacitive sensing techniques, but the same finger may not be detected if its location were to fall within the exclusion region 340 due to the uncertainty caused by emitted signals from the active input device. Depending on the size and spacing of capacitive pixels 305, the practical effect may be insignificant if the passive input device (e.g., the finger 330) is required to be particularly close to the position of the active input device to fall within the exclusion region 340.

As a result, the processing system for the input device may be capable of receiving input from both active and passive input devices within a single sensing frame. Application of these concepts and techniques may be used to extend the capabilities of input devices that are configured for capacitive sensing to support one or more different types of active input devices.

Figure 3C:
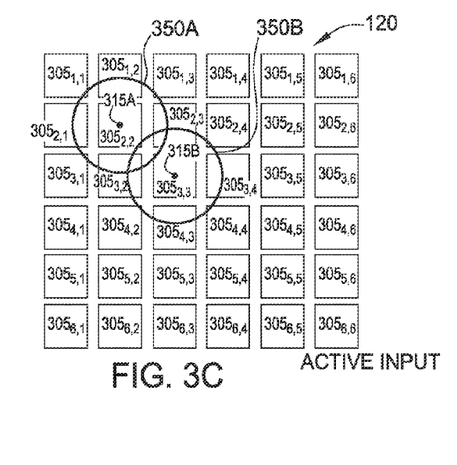

In FIG. 3C, and similar to the operation of FIG. 3A, sensor electrodes of the sensing region 120 are operated in an active input mode, and input signals from an active input device 310 are received within the sensing region 120. Specifically, at a first time during the active input mode, the signals emitted from active input device 310 (e.g., at pen tip 312) are represented as affecting capacitive pixels 305 that are at least partially included within a zone 350A, and at a second time the emitted signals affect capacitive pixels 305 within a zone 350B. In one embodiment, each of the first and second times may occur within a single sensing frame. In one embodiment, each of the first and second times may occur within a single portion of one sensing frame. The determined position 315A of the active input device at the first time corresponds to the zone 350A, and the determined position 315B at the second time corresponds to the zone 350B. While the positions 315A, 315B are disposed near particular capacitive pixels $305_{2,2}$ and $305_{3,3}$ in this example for ease of understanding, the positions could include any alternate position relative to one or more capacitive pixels. The differences between the determined positions and times may be used to calculate a velocity of the active input device 310.

Figure 3D:
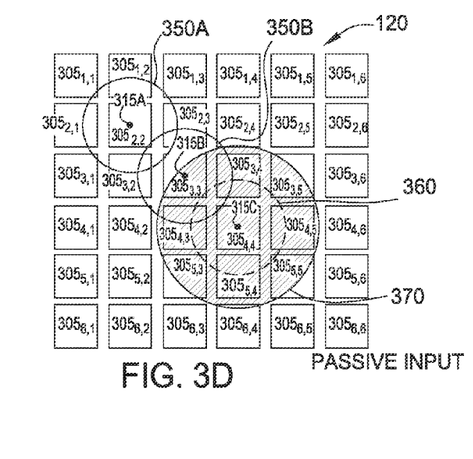

FIG. 3D illustrates operation of the processing system in a passive input mode at a third time. The processing system operates the sensor electrodes of the sensing region 120 to detect input from a passive input device, such as fingers 330. The calculated velocity of the active input device 310 (e.g., using positions 315A and 315B) may be applied to the second position to determine an exclusion zone 370. In one embodiment, the velocity value may be multiplied with estimated time values to one or more events during the passive input sensing period. Some example events include the beginning of the passive input sensing period, the end of the passive input sensing period, and at (or slightly before) one or more measurement times within the passive input sensing period. The events may be selected to determine an exclusion region 370 that is suitable for isolating effects of active input device 310 on passive input sensing.

Assuming, for purposes of this example, that the time interval between the first time (zone 350A) and the second time (zone 350B) is the same as the interval between the second time and the third time (passive input mode). The product of the determined velocity and the time interval may be applied to the position 315B at the second time in order to estimate the location 315C of the active input device at the third time. Determining the exclusion region 370 may also include estimating a zone 360 corresponding to the location 315C at the third time, as well as applying a confidence measure to the zone 360 consistent with the descriptions provided above.

Figure 4A:
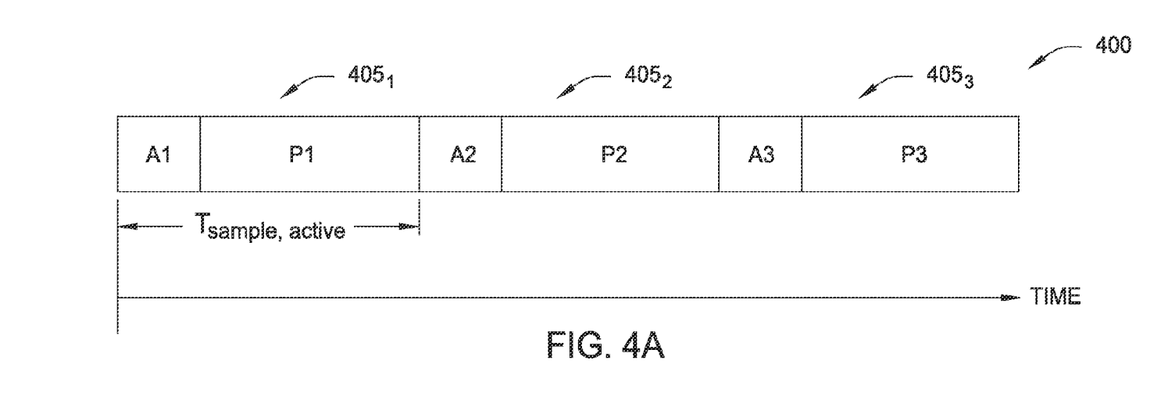
FIGS. 4A and 4B illustrate timing charts for receiving active input and passive input, according to one embodiment.
Figure 4B:
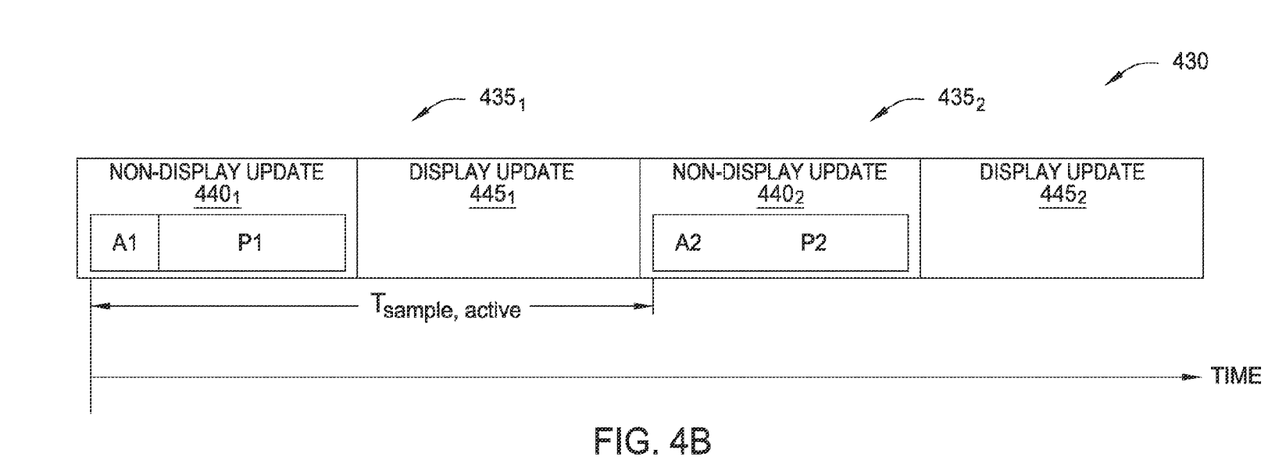

FIGS. 4A and 4B illustrate timing charts for receiving active input and passive input, according to one embodiment. Timing chart 400 includes a plurality of consecutive sensing frames 405. Each sensing frame 405 includes at least one active input sensing period A and at least one passive input sensing period P. In one embodiment, a sensing frame 405 includes one active input sensing period A and one passive input sensing period P. In another embodiment, a sensing frame 405 includes two or more input sensing periods of at least one of the types (i.e., active and passive), and the sensing periods of either type may be consecutively timed or separated in time, in a pattern of alternating types or other suitable pattern, and so forth. The passive input sensing periods P may generally be longer than the active input sensing periods A due to various measurements and processing that are generally required for the processing system to determine the passive input.

In order to enable an input device configured for passive input sensing (e.g., capacitive sensing) to receive input from active input devices, the timing of the passive sensing may be adjusted to meet certain timing criteria. For example, supporting operation of an active input device requires establishing a communication channel with the active input device by taking periodic samplings of the active input device signal at times consistent with the timing of the emitted signal (e.g., in order to capture discrete signal bursts emitted from the active input device). In one embodiment, the period of each sensing frame 405 may be set based on the period of the active input device signal ($T_{sample,\ active}$) that represents a periodicity between signal bursts. Specifically, the active input sensing periods A may be set to occur at consistent times relative to the active input device signal to establish the communication channel. In one embodiment, the period $T_{sample,\ active}$ corresponds to a frequency of 10 kilohertz (kHz) or more (that is, values of 100 microseconds (μs) or less). The timing chart 400 shows an essentially continuous input sampling performed by the processing system, which alternates between active input sensing periods and passive input sensing periods (A1 and P1, then A2 and P2, then A3 and P3, and so forth). In one embodiment, the sequence of sensing frames may be performed at least partly overlapping in time with display updating signals.

However, in some cases the processing system may allot only a finite amount of time for performing input sensing. In one embodiment, input sensing may be performed only during a sensing window corresponding to non-display update periods, such as during an h-blank period, long h-blank period, v-blank period, and so forth. Depending on the length of the sensing frame period, each sensing window may include a fixed number of consecutive sensing frames.

Timing chart 430 includes two display frames $435_1$, $435_2$ and illustrates an implementation in which sensing is performed only during non-display update periods. The timing of the display frames 435 is generally not drawn to scale. Each display frame 435 includes non-display update periods 440 and display update periods 445, which may include one or more of each type of update period and which may be non-contiguous. Although not shown, some embodiments may include a plurality of display line update periods in the display update periods 440. Each display line update period represents an amount of time used to update a single display line of a display screen in the input device. In one embodiment, the non-display update period 440 corresponds to a long h-blank period, the length of which may be equal to or greater than a display line update period.

The properties of active input sensing periods A and passive input sensing periods P (such as numbers of each type, lengths, pattern) within a particular display frame 435 may be selected based on the length of the sensing window available within the non-display update period 440. In some embodiments, consecutive active input sensing periods A are spaced apart by an amount of time equaling the periodicity of the active input device signal ($T_{sample,\ active}$) in order to maintain the communication channel for the active input device 310. The consecutive active input sensing periods A may be within a same display frame 435 (whether in a same or different non-display update period 440) or in different display frames (as shown).

In some embodiments, the processing system may detect harmonics of the active input device signal, such as a third harmonic or any suitable harmonic that is higher than the fundamental frequency of the active input device signal. The processing system may set the length and spacing of the active input sensing periods A in order to detect the selected harmonics. Generally, use of higher harmonics allows the same communications bursts from the active input device to be detected in a smaller time window, and so allows a larger remainder of time (e.g., during a particular non-display update period 440) to perform passive input sensing or other functions. For example, using a third harmonic of the fundamental frequency corresponds to a period of one-third the size of the fundamental period, offering a substantial time savings. The harmonic may be selected based on performance levels of the active and/or passive input sensing modes. For example, if the signal strength of the active input device at a particular frequency (whether fundamental or at a harmonic) exceeds a threshold value, the processing system may select a next-highest harmonic for active input sensing. Alternatively, input sensing performance during the passive input sensing mode may be determined to be inadequate, and another harmonic may be selected for active input sensing responsive to this determination. This way, less time may be unnecessarily allotted to active input sensing periods where the signal quality is adequate, and increased time may be used for passive input sensing, improving processing system performance. Of course, lower harmonics may be also be used. In some embodiments, lower harmonics may be selected for active input sensing where performance of active input sensing is inadequate and/or where performance of passive input sensing is adequate.

In some embodiments, the particular frequencies/periods for active input sensing and passive input sensing may be selected based on relative amounts of the types of inputs. For example, if a user applies mostly active inputs to the sensing region 120, the processing system may operate in an active input-heavy mode, allotting more time to perform active input sensing and less time for passive input sensing. The processing system may select this operation based on a particular amount of time without the user providing a type of input, on current or historical percentages of each type of input, etc. The processing system may also dynamically adapt the mode or frequencies based on new inputs (e.g., if the user begins to provide relatively more passive input, more time within the sensing window may be allotted for performing passive input).

Figure 5A:
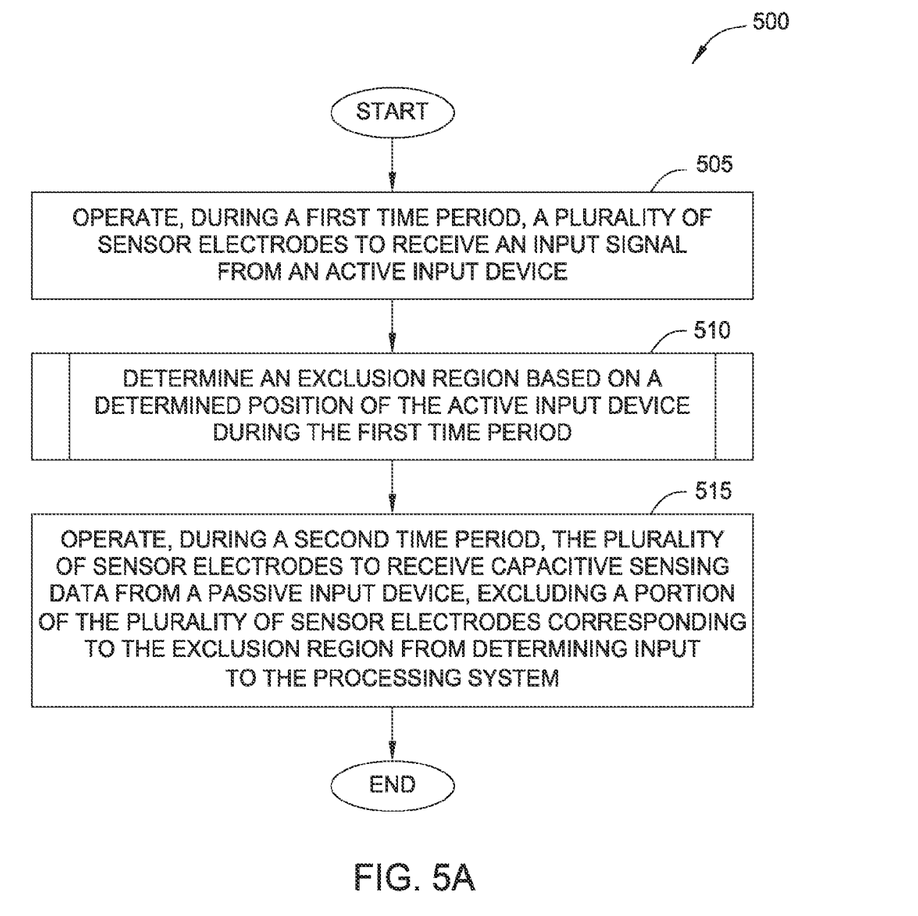
FIG. 5A illustrates a method of receiving active input using an input device configured to receive passive input, according to one embodiment.

FIG. 5A illustrates a method 500 of receiving active input using an input device configured to receive passive input, according to one embodiment. The method 500 may generally be used in view of the descriptions of the input device 100, processing system 110, and sensing region 120 provided above.

The method 500 begins at block 505, where a processing system operates, during a first time period, a plurality of sensor electrodes to receive an input signal from an active input device. The time period may be an active input sensing period included with one or more passive input sensing periods within a sensing window.

At block 510, the processing system determines an exclusion region based on a determined position of the active input device during the first time period. The exclusion region generally operates to localize the effects of signals emitted from the active input device while operating in a passive sensing mode. The exclusion region may include one or more sensor electrodes.

The exclusion region may be based on a zone of capacitive pixels that are affected by input signals from the active input device more than some threshold amount. A position of the active input device (e.g., a position of an active pen tip) may be determined based on the strength of the received signals by the various capacitive pixels. A confidence measure may be applied to the determined zone to define an area larger than the zone, for example increasing a radius from that of the zone or discretely adding other capacitive pixels to the exclusion region.

The confidence measure may be applied to account for any variability of the active input signal or movement of the active input device, and may be based on an amount of time until the next active input sensing period (or when the next position of the active input device is determined).

At block 515, the processing system operates, during a second time period, the plurality of sensor electrodes to receive capacitive sensing data corresponding to a passive input device. When determining passive input, the processing device excludes the portion of the plurality of sensor electrodes that corresponds to the determined exclusion region, which may include not driving the excluded sensor electrodes during a second time period, or ignoring the input received at the excluded sensor electrodes during the second time period.

As a result, the processing system for an input device may be capable of receiving input from both active and passive input devices within a single sensing frame. The method 500 may therefore be used to extend the capabilities of input devices that are configured for capacitive sensing to support one or more different types of active input devices.

Figure 5B:
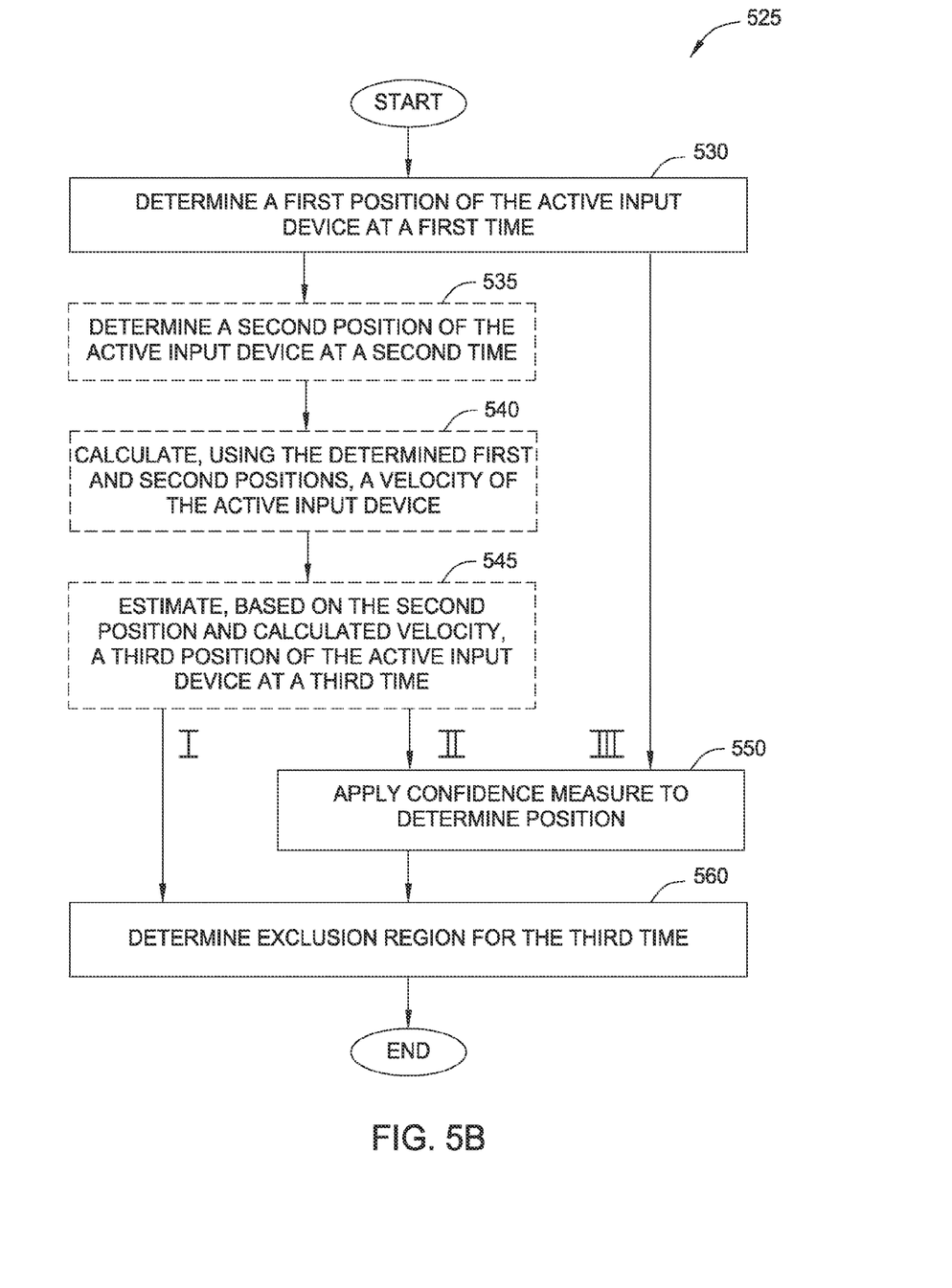
FIG. 5B illustrates a method of determining an exclusion region for receiving passive input, according to one embodiment.

FIG. 5B illustrates a method 525 of determining an exclusion region for receiving passive input, according to one embodiment. Generally, the method 525 may be used as a subroutine of block 510 of method 500.

The method 525 begins at block 530, where at a first time the processing system determines a first position of the active input device. The first time may be during an active input sensing period for the processing system. This may include a comparison of signal strength received from the active input device at a plurality of capacitive pixels or sensor electrodes, e.g., determining a zone corresponding to the effects of the emitted signals. The first position of the active input device may generally correspond to the position having a largest signal strength.

The exclusion region may be determined in a number of different ways, selectively applying confidence measures and/or velocity information to determine the portions of sensing region 120 excluded from providing sensing input during passive input sensing periods. Accordingly, example paths I, II, and III are defined within the method 525, but other paths are possible. Depending on the particular path selected (here, I or II), the method 525 may continue to block 535, where a second position of the active input device is determined at a second time. The second time may be during the same active input sensing period as during the first time, or perhaps during a subsequent period. Determining the second position may generally be done in a similar manner as determining the first position. At block 540, the determined first and second positions may be used to calculate a velocity of the active input device. The velocity may be calculated as the spatial difference of the positions over the time between determinations. At block 545, a third position of the active input device at a third time may be estimated based on the second position and the calculated velocity. The third time may relate to a subsequent active input sensing period.

According to path I, following block 545 the exclusion region for the processing system may be determined corresponding to the third time. The exclusion region may be prospectively determined to isolate the effects of an active input device during a subsequent of passive input sensing.

According to path II, following block 545 a confidence measure may be applied for the estimated position. The confidence measure may extend the exclusion region and help account for any possibility of variability in the position of the active input device or in the emitted signals.

According to path III, following block 530 the confidence measure may be applied to the first position at block 550, and the exclusion region may then be determined for the first position at block 560.

Further, the flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

I claim:

1. A processing system, comprising:
   a sensor module configured to:
      operate, during a first time period, a plurality of sensor electrodes to receive an input signal from an active input device, and
      operate, during a different second time period, the plurality of sensor electrodes to receive capacitive sensing data corresponding to a passive input device; and
   a determination module configured to determine an exclusion region based on a confidence measure applied to an estimated position of the active input device during the second time period, the estimated position based on at least one determined position of the active input device during the first time period, the exclusion region corresponding to expected effects of the active input device on the plurality of sensor electrodes during the second time period,
   wherein, during the second time period, an excluded portion of the plurality of sensor electrodes corresponding to the determined exclusion region is excluded from use in determining input from the passive input device to the sensor module.

2. The processing system of claim 1, wherein each of the plurality of sensor electrodes comprises at least one common electrode for performing capacitive sensing and for display updating.

3. The processing system of claim 1, wherein the sensor module is configured to drive the plurality of sensor electrodes to perform absolute capacitive sensing during the second time period.

4. The processing system of claim 1, wherein the plurality of sensor electrodes are disposed in a matrix arrangement.

5. The processing system of claim 1, wherein determining the exclusion region is based on the at least one determined position of the active input device and an estimated velocity of the active input device.

6. The processing system of claim 1, wherein excluding the excluded portion from determining input from the passive input device comprises one of electrically floating the excluded portion during the second time period and driving the excluded portion with a substantially constant voltage during the second time period.

7. The processing system of claim 1, wherein excluding the excluded portion from determining input from the passive input device comprises ignoring a portion of the capacitive sensing data received by the excluded portion during the second time period.

8. The processing system of claim 1, wherein the confidence measure is based on at least one of a calculated velocity of the active input device, an estimated amount of time until a subsequent sensing period for the active input device, and a determined coordinate of the active input device in a dimension orthogonal to an area of the exclusion region.

9. The processing system of claim 1, wherein determining the exclusion region comprises:
 determining, based on the estimated position of the active input device, a zone comprising one or more first capacitive pixels that are expected to receive effects from the active input device at a threshold level or greater during the second time period; and
 adding, based on the applied confidence measure, one or more second capacitive pixels to the zone, each of the one or more second capacitive pixels being adjacent to at least one of the one or more first capacitive pixels.

10. The processing system of claim 1, wherein the first time period and second time period are included in a sensing frame having a sensing frame period, the sensing frame period determined on a period between signal bursts of the received input signal.

11. The processing system of claim 10, wherein one or more portions of a sensing frame are performed during a non-display update period for a display device coupled with the processing system.

12. An input device, comprising:
 a plurality of display electrodes;
 a plurality of sensor electrodes; and
 a processing system coupled to the plurality of display electrodes and to the plurality of sensor electrodes, wherein the processing system is configured to:
  operate, during a first time period, the plurality of sensor electrodes to receive an input signal from an active input device,
  operate, during a different second time period, the plurality of sensor electrodes to receive capacitive sensing data corresponding to a passive input device;
  determine, based on the received input signal from the active input device, at least one position of the active input device during the first time period;
  estimate, based on the determined at least one position of the active input device, an estimated position of the active input device during the second time period;
  determine an exclusion region based on a confidence measure applied to the estimated position of the active input device, the exclusion region corresponding to expected effects of the active input device on the plurality of sensor electrodes during the second time period,
  wherein, during the second time period, an excluded portion of the plurality of sensor electrodes corresponding to the determined exclusion region is excluded from use in determining input from the passive input device to the processing system.

13. The input device of claim 12, wherein each of the plurality of sensor electrodes comprises at least one common electrode for performing capacitive sensing and for display updating.

14. The input device of claim 12, wherein the processing system is configured to drive the plurality of sensor electrodes to perform absolute capacitive sensing during the second time period.

15. The input device of claim 12, wherein the plurality of sensor electrodes are disposed in a matrix arrangement.

16. The input device of claim 12, wherein determining the exclusion region is based on the at least one determined position of the active input device and an estimated velocity of the active input device.

17. The input device of claim 12, wherein excluding the excluded portion from determining input from the passive input device comprises one of electrically floating the excluded portion during the second time period and driving the excluded portion with a substantially constant voltage during the second time period.

18. The input device of claim 12, wherein excluding the excluded portion from determining input from the passive input device comprises ignoring a portion of the capacitive sensing data received by the excluded portion during the second time period.

19. The input device of claim 12, wherein at least one of the first and second time periods partially overlap with a display update period during which the plurality of display electrodes are driven with display update signals.

20. The input device of claim 12, wherein the first and second time periods are included within a long horizontal blanking period during which display updating is not performed by the plurality of display electrodes.

21. A method, comprising:
 operating, during a first time period, a plurality of sensor electrodes to receive an input signal from an active input device at a processing system;
 determining, based on the received input signal from the active input device, at least one position of the active input device during the first time period;
 estimating, based on the determined at least one position of the active input device, an estimated position of the active input device during a different second time period;
 determining an exclusion region based on a confidence measure applied to the estimated position of the active input device; and
 operating, during the second time period, the plurality of sensor electrodes to receive capacitive sensing data corresponding to a passive input device,
 wherein, during the second time period, an excluded portion of the plurality of sensor electrodes corresponding to the determined exclusion region is excluded from use in determining input from the passive input device to the processing system.

22. The method of claim 21, wherein the operating the plurality of sensor electrodes during the second time period includes driving the plurality of sensor electrodes with a capacitive sensing signal.

23. The method of claim 21, wherein determining the exclusion region is based on the determined at least one position of the active input device and an estimated velocity of the active input device.

24. The method of claim 21, wherein excluding the excluded portion from determining input from the passive input device comprises one of electrically floating the excluded portion during the second time period and driving the excluded portion with a substantially constant voltage during the second time period.

* * * * *